(12) United States Patent
Han et al.

(10) Patent No.: US 11,537,079 B2
(45) Date of Patent: Dec. 27, 2022

(54) 3D HOLOGRAM IMAGE PRODUCING LAMP FOR VEHICLE

(71) Applicants: HYUNDAI MOBIS CO., LTD., Seoul (KR); FUTURE TECHNOLOGY RESEARCH CENTER., LTD., Yongin-si (KR)

(72) Inventors: Gil Won Han, Yongin-si (KR); Dae Hyun Kim, Yongin-si (KR); Kwang Ho Ok, Yongin-si (KR)

(73) Assignees: HYUNDAI MOBIS CO., LTD., Seoul (KR); FUTURE TECHNOLOGY RESEARCH CENTER., LTD., Yongin-si (KR)

( * ) Notice: Subject to any disclaimer, the term of this patent is extended or adjusted under 35 U.S.C. 154(b) by 88 days.

(21) Appl. No.: 17/085,097

(22) Filed: Oct. 30, 2020

(65) Prior Publication Data

US 2021/0132543 A1 May 6, 2021

(30) Foreign Application Priority Data

Nov. 1, 2019 (KR) .................. 10-2019-0138252

(51) Int. Cl.
*G03H 1/22* (2006.01)
*G02B 5/32* (2006.01)
*F21S 41/10* (2018.01)
*F21S 41/20* (2018.01)
*F21S 41/33* (2018.01)

(52) U.S. Cl.
CPC ............ *G03H 1/2249* (2013.01); *F21S 41/10* (2018.01); *F21S 41/285* (2018.01); *F21S 41/33* (2018.01); *G02B 5/32* (2013.01); *G03H 2210/30* (2013.01); *G03H 2222/12* (2013.01); *G03H 2223/24* (2013.01)

(58) Field of Classification Search
CPC ............ G03H 1/2249; G03H 2210/30; G03H 2222/12; G03H 2223/24; G03H 2001/0232; G03H 2227/06; G03H 1/268; F21S 41/10; F21S 41/285; F21S 41/33; F21S 43/26; F21S 43/31; F21S 43/50; F21S 43/00; F21S 41/00; G02B 5/32
USPC ................................ 359/475, 466, 477, 462
See application file for complete search history.

(56) References Cited

U.S. PATENT DOCUMENTS

| 11,215,823 B2* | 1/2022 | Li ......................... G03H 1/2205 |
| 2018/0094791 A1* | 4/2018 | Lee ..................... G03H 1/2286 |
| 2020/0233134 A1* | 7/2020 | Redmond ................ G02B 5/32 |

FOREIGN PATENT DOCUMENTS

KR        10-2014873 B1      8/2019

* cited by examiner

Primary Examiner — Jade R Chwasz
(74) Attorney, Agent, or Firm — DLA Piper LLP (US)

(57) ABSTRACT

A three-dimensional hologram image producing lamp for a vehicle comprises a light source, a hologram plate displaying a three-dimensional hologram image, a curved slope mirror having a reflecting surface shaped as a parabolic curved surface, facing the light source, and reflecting light, radiated from the light source, toward the hologram plate, and a housing disposed on a lamp receptacle of a vehicle body and having the hologram plate, the light source, and the curved slope mirror mounted thereon.

8 Claims, 6 Drawing Sheets

3D HOLOGRAM IMAGE PRODUCING LAMP FOR VEHICLE

CROSS-REFERENCE TO RELATED APPLICATION

This application claims priority from and the benefit of Korean Patent Application No. 10-2019-0138252, filed on Nov. 1, 2019, which is hereby incorporated by reference for all purposes as if set forth herein.

BACKGROUND

Field

Exemplary embodiments of the present disclosure relate to a three-dimensional (3D) hologram image producing lamp for a vehicle, and more particularly, to a 3D hologram image producing lamp for a vehicle, the lamp being able to display a 3D hologram image.

Discussion of the Background

In general, a vehicle is provided with lamps having a lighting function allowing a driver to easily recognize objects located around the vehicle during night driving and a signaling function indicating the driving state of the vehicle to other drivers or pedestrians. For example, head lamps, fog lamps, and the like generally realize the lighting function, while turn signal lamps, tail lamps, and the like mainly realize the signaling function. In some cases, both the lighting function and the signaling function may be realized by the same lamp.

Such vehicle lamps are major design elements determining the design of a vehicle while securing visibility. Attempts for expressing various light images, such as a three-dimensional (3D) image, using vehicle lamps have continuously been conducted in order to secure designs and aesthetic appearances different from other manufacturers' vehicles or other vehicle types.

A hologram is characterized in that an image is produced when light enters a plate on which the hologram is recorded at a predetermined angle. The existing holographic optical systems respectively include three or more mirrors to clearly realize a predetermined incidence angle. Holographic optical systems need a large space to be disposed therein, due to an excessively long optical distance including a shutter, a filter, a lens, and a plurality of mirrors that are sequentially passed. It is difficult to apply the holographic optical system to a vehicle lamp, which is problematic. Therefore, an improvement is required to overcome this problem.

A background art of the present disclosure is disclosed in Korean Patent No. 2014873 (Aug. 21, 2019; titled *"HOLOGRAM IMAGE PRODUCING LAMP FOR VEHICLE"*).

SUMMARY

Various embodiments are directed to provide a three-dimensional (3D) hologram image producing lamp for a vehicle, the lamp being able to have a reduced optical distance and a small size so that the lamp is applicable to a vehicle.

In an embodiment, provided is a three-dimensional hologram image producing lamp for a vehicle. The lamp may include: a light source; a hologram plate displaying a three-dimensional hologram image; a curved slope mirror having a reflecting surface shaped as a parabolic curved surface, facing the light source, and reflecting light, radiated from the light source, toward the hologram plate; and a housing disposed on a lamp receptacle of a vehicle body and having the hologram plate, the light source, and the curved slope mirror mounted thereon.

The curved slope mirror may extend along a parabola having a focus at a point, at which the light source is disposed.

An intersecting point of an x axis and a y axis may be an origin O (0, 0), the light source may be disposed at point P (0, -p) on the y axis, and the curved slope mirror may extend on a parabola corresponding to a value (x, y) of a formula $x^2 = -4py$, where $p \neq 0$.

The curved slope mirror may be inclined toward the hologram plate at a predetermined angle.

When directions parallel to a longitudinal direction and a width direction of the hologram plate are set an x direction and a y direction, respectively, an incidence angle $\alpha$ of light entering the hologram plate and a tilt angle $\beta$ of the curved slope mirror may have a relationship $-(90° - \alpha)/2 = \beta$ with respect to a z direction.

The hologram plate may include: a plate portion including a light-transmitting material and mounted on the housing; and a hologram film portion coupled to the plate portion and displaying a three-dimensional hologram image corresponding to hologram information recorded therein by receiving the light reflected by the curved slope mirror.

The hologram film portion may include: a first film portion mounted on one surface portion of the plate portion and forming a first three-dimensional hologram image; and a second film portion mounted on the other surface portion of the plate portion and forming a second three-dimensional hologram image.

The housing may include: a housing body having a space defined therein; a frame connected to a side portion of the housing body, with the hologram plate being disposed thereon; a light source mounting portion connected to a bottom portion of the housing body, with the light source being disposed thereon; and a cover coupled to a top portion of the housing body, with the curved slope mirror being disposed thereon.

The 3D hologram image producing lamp for a vehicle according to the present disclosure may display a 3D hologram image by a reduced optical distance from the light source to the hologram plate through the curved slope mirror, more particularly, an optical distance corresponding to about 1.5 times the height of the housing.

Here, the depth-directional length of the housing is sufficient when light reflected by the curved slope mirror may arrive at an intermediate portion of the length in the width direction of the hologram plate at a predetermined incidence angle $\alpha$. Thus, the housing may be compactly fabricated and used in a small size according to the size of the hologram plate.

For example, the width in the longitudinal direction of the hologram plate (i.e. the x direction) and the width in the width direction of the hologram plate (i.e. the y direction) are 300 mm and 100 mm, respectively, the 3D hologram image producing lamp for a vehicle according to the present disclosure may be fabricated and used in a small size of 300 mm×(130 mm to 150 mm)×35 mm. This means that the 3D hologram image producing lamp may be compactly fabricated and used at the ratio of this size so as to comply with the size of the hologram plate.

The 3D hologram image producing lamp for a vehicle according to the present disclosure may be realized in a small size to be applicable to a vehicle, as described above.

Accordingly, the 3D hologram image producing lamp may be freely applied to more various positions as a vehicle lamp for performing a lighting function, a signaling function, a convenience function, a design function, and the like. In realizing the same function, the 3D hologram image producing lamp may realize more various stereoscopic aesthetic appearances and degrees of freedom of design.

DETAILED DESCRIPTION OF THE ILLUSTRATED EMBODIMENTS

Hereinafter, embodiments of a three-dimensional (3D) hologram image producing lamp for a vehicle according to the present disclosure will be described with reference to the accompanying drawings. In the following description, the thicknesses of lines or the sizes of components illustrated in the drawings may be exaggerated for clarity and convenience of explanation. In addition, terms used herein are defined in consideration of functions thereof in the present disclosure, but may vary depending on the intentions of users or operators, or practices. Therefore, the terms shall be defined on the basis of the description throughout the specification.

Figure 1:
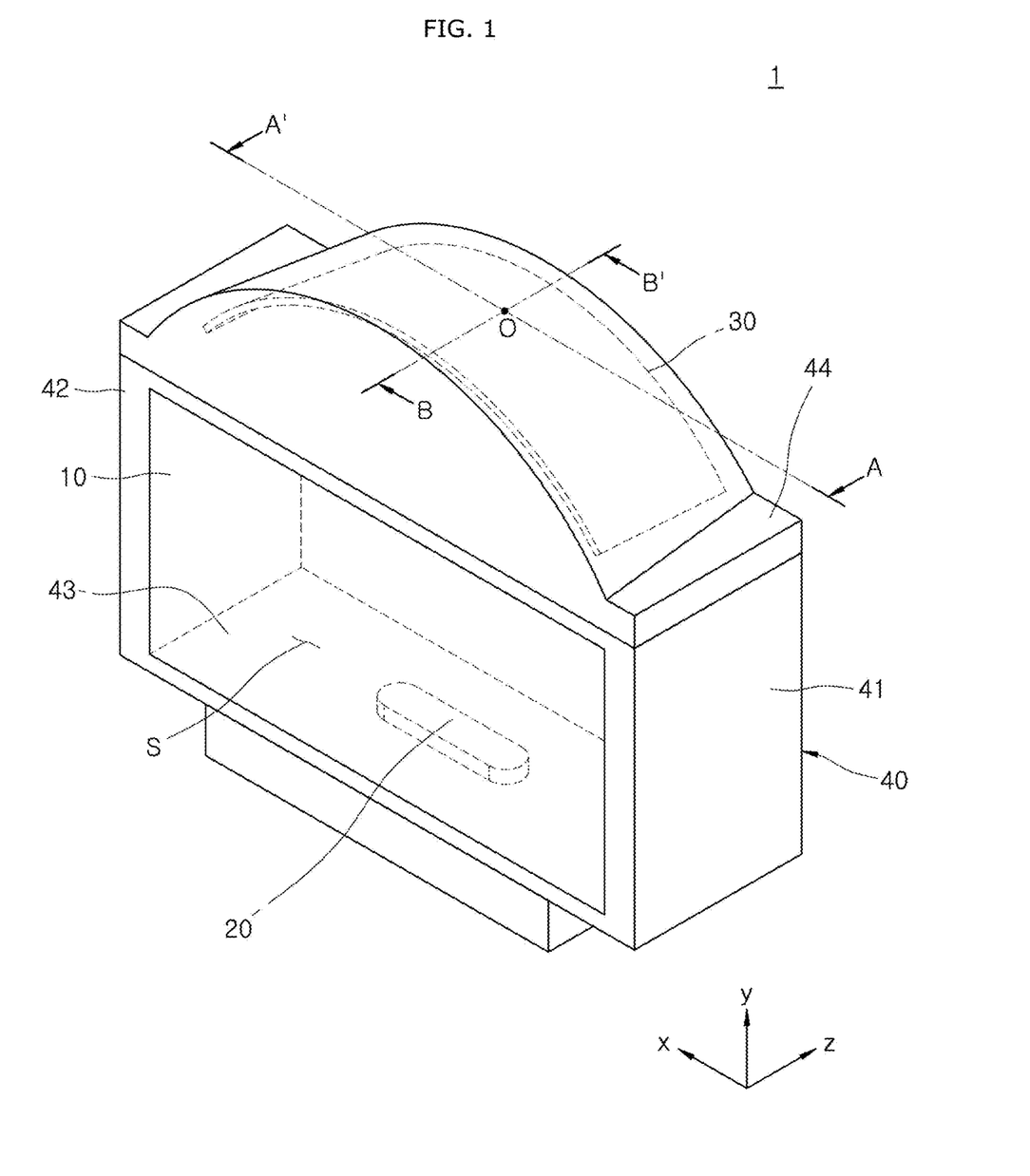
FIG. 1 is a perspective view schematically illustrating a 3D hologram image producing lamp for a vehicle according to an embodiment of the present disclosure.
Figure 2:
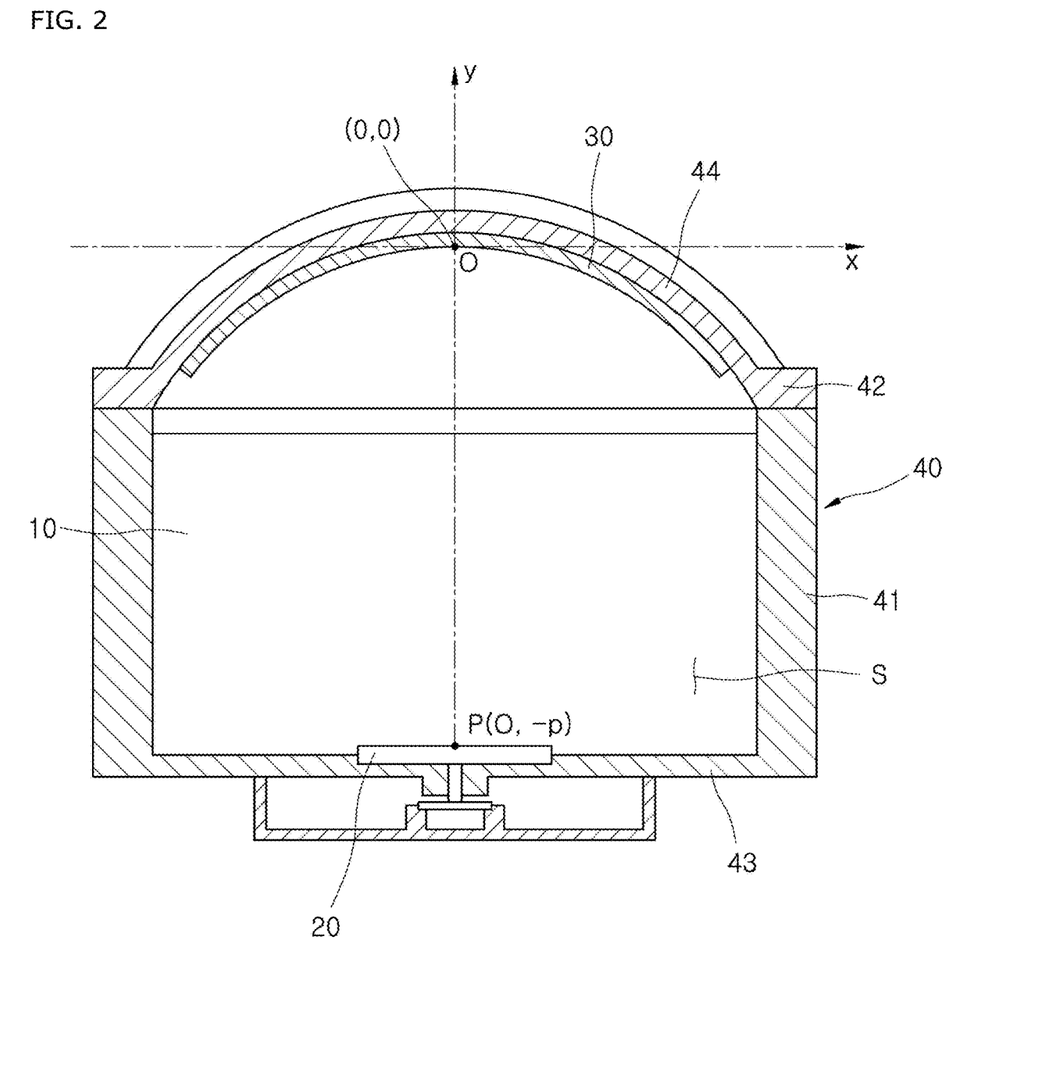
FIG. 2 is a cross-sectional view taken along the line A-A' in FIG. 1.
Figure 3:
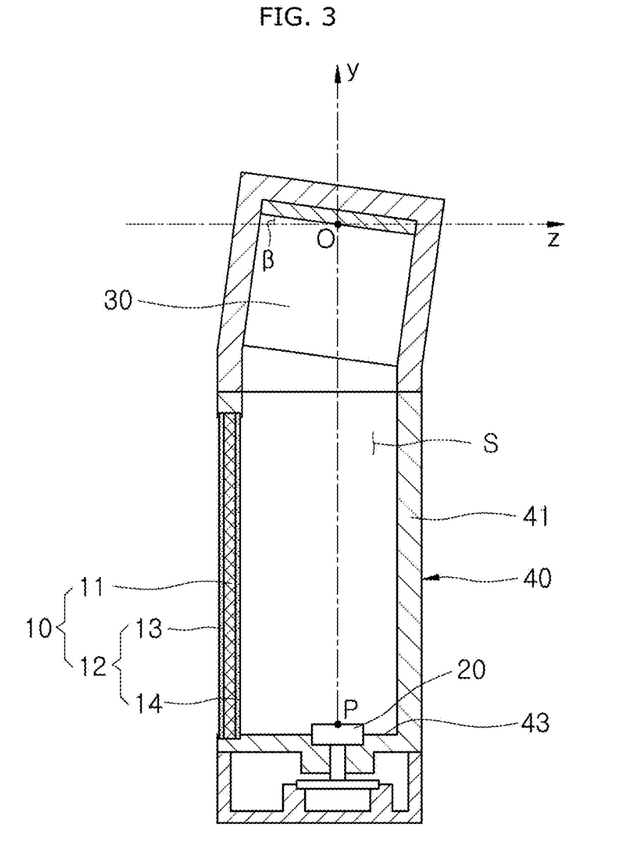
FIG. 3 is a cross-sectional view taken along the line B-B' in FIG. 1.

FIG. 1 is a perspective view schematically illustrating a 3D hologram image producing lamp 1 for a vehicle according to an embodiment of the present disclosure, FIG. 2 is a cross-sectional view taken along the line A-A' in FIG. 1, and FIG. 3 is a cross-sectional view taken along the line B-B' in FIG. 1.

Referring to FIGS. 1 to 3, the 3D hologram image producing lamp 1 for a vehicle according to the embodiment of the present disclosure includes a hologram plate 10, a light source 20, a curved slope mirror 30, and a housing 40.

The hologram plate 10 receives light emitted from the light source 20 and displays a 3D hologram image outside the housing 40 so as to perform a function of a vehicle lamp.

The light source 20 radiates light for forming a stereoscopic image of the hologram plate 10. The light source 20 is not particularly limited to as long as it generates light, but may be implemented as a laser including a laser diode (LD). Here, light has a characteristic of a laser beam that has directivity in a specific direction. The laser beam radiated from the laser diode may be in the form of a diffused light having a variety of predetermined angle ranges (e.g. 40 to 50°) depending on the specification.

The curved slope mirror 30 has a reflecting surface in the shape of a parabolic curved surface, is disposed to face the light source 20, and reflects light, radiated from the light source 20, toward the hologram plate 10. The curved slope mirror 30 according to the embodiment of the present disclosure is disposed to extend along a parabola having a focus P at a point, at which the light source 20 is disposed, while being inclined at a predetermined angle, i.e. a tilt angle β, directed toward the hologram plate 10.

Since the curved slope mirror 30 has the above-described shape, when light radiated from the light source 20 toward the curved slope mirror 30 arrives at the curved slope mirror 30, the light may be reflected and travel in the same direction to enter the hologram plate 10 at an incident angle α, irrespective of the location of the curved slope mirror 30 at which the light arrives.

The housing 40 supports the hologram plate 10, the light source 20, and the curved slope mirror 30 in set positions. A hollow space S, in which light may travel and be reflected, is defined by the hologram plate 10, the light source 20, the curved slope mirror 30, and the housing 40. The housing 40 has a case structure having the space S therein, and is shaped such that one side portion thereof, in which the hologram plate 10 is disposed, is open.

The hologram plate 10 is disposed on the open side portion of the housing 40, and the light source 20 and the curved slope mirror 30 are disposed on the bottom portion and the top portion of the housing 40, respectively, so as to face each other. Due to this arrangement, light radiated from the light source 20 travels upward toward the curved slope mirror 30, arrives at the curved slope mirror 30, and then is reflected downward toward the hologram plate 10, thereby exiting the housing 40 through the hologram plate 10.

Figure 6:
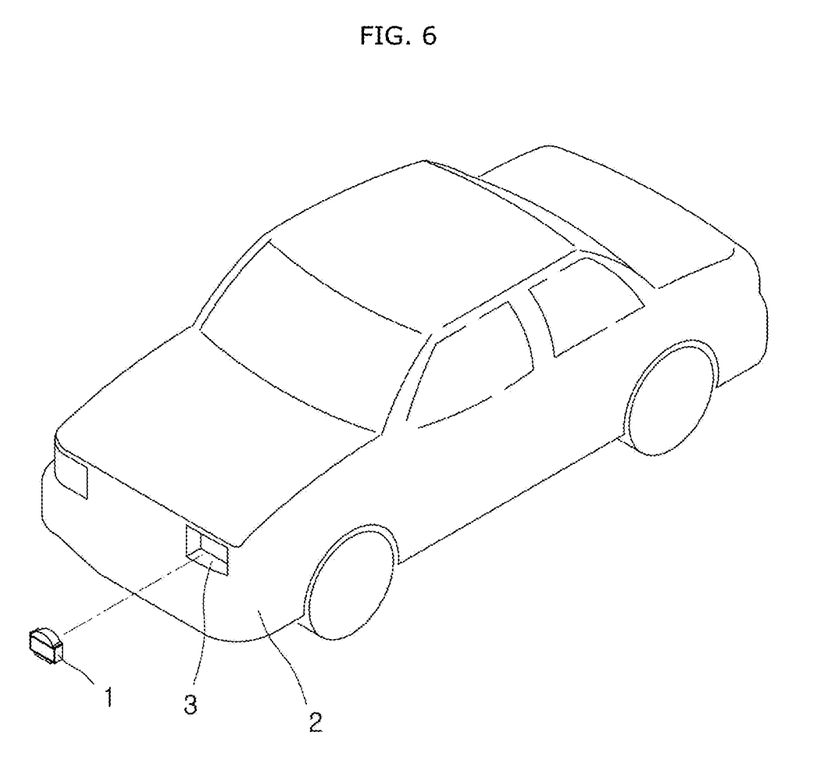
FIG. 6 is a conceptual view illustrating an example in which the 3D hologram image producing lamp for a vehicle according to the embodiment of the present disclosure is disposed on a vehicle.

The housing 40, with the hologram plate 10, the light source 20, and the curved slope mirror 30 being mounted and coupled thereto, is disposed on a lamp receptacle 3 provided in a vehicle body 2, such that the 3D hologram image producing lamp 1 for a vehicle according to the present disclosure may realize functions of a vehicle lamp, including a lighting function, a signaling function, a convenience function, a design function, and the like (see FIG. 6).

Hereinafter, for the convenience of description, the arrangements and shapes of the hologram plate 10, the light source 20, the curved slope mirror 30, and the housing 40 will be described in more detail with respect to the x direction, the y direction, and the z direction illustrated in FIGS. 1 to 3.

Referring to FIG. 3, the hologram plate 10 according to the embodiment of the present disclosure includes a plate portion 11 and a hologram film portion 12.

The plate portion 11 is a device portion supporting the hologram film portion 12 in an intended shape, such as a plane, has the shape of a panel, and is mounted on the housing 40. More specifically, the plate portion 11 has the shape of a panel having a length (e.g. 300 mm) in the x direction (i.e. longitudinal direction) and a length (e.g. 100 mm) in the y direction (i.e. width direction), and is mounted on a z-direction side portion of the housing 40.

The plate portion 11 is made of a transparent or translucent light-transmitting material, and has a level of strength capable of supporting the hologram film portion 12 in an intended shape, such as a plane. The plate portion 11 may be made of a variety of materials, such as polycarbonate (PC) or acrylic resin, capable of obtaining transparency and strength.

The hologram film portion 12 is a device portion displaying a 3D hologram image, has a hologram storage medium capable of forming a hologram when light enters the hologram film portion 12 at a predetermined incident angle α, and is coupled to the plate portion 11. The hologram film portion 12 according to the embodiment of the present disclosure has a structure including a first film portion 13 and a second film portion 14 mounted on both z-direction surfaces of the plate portion 11, respectively.

Due to the first film portion 13, a first 3D hologram image corresponding to hologram information recorded in the first film portion 13 may be generated. For example, the first 3D hologram image may be a protruding 3D image having a convex shape toward a viewer of the image. Due to the second film portion 14, a second 3D hologram image corresponding to hologram information recorded in the second film portion 14 may be generated. For example, the second 3D hologram image may be a recessed image having a convex shape away from the viewer of the image.

Due to the combination of the first 3D hologram image and the second 3D hologram image as described above, more various, more detailed, and clearer 3D hologram images may be displayed than an embodiment using only a single hologram film portion 12. The hologram film portion 12 according to the embodiment of the present disclosure is intended to disclose an exemplary embodiment, but the present disclosure is not limited thereto.

The hologram film portion 12 according to the present disclosure is not limited to a specific structure or form, such as those publicly-known in the art, as long as it may display a 3D hologram image corresponding to the hologram information recorded in the hologram storage medium by receiving light reflected by the curved slope mirror 30 and is applicable to a vehicle.

Figure 4:
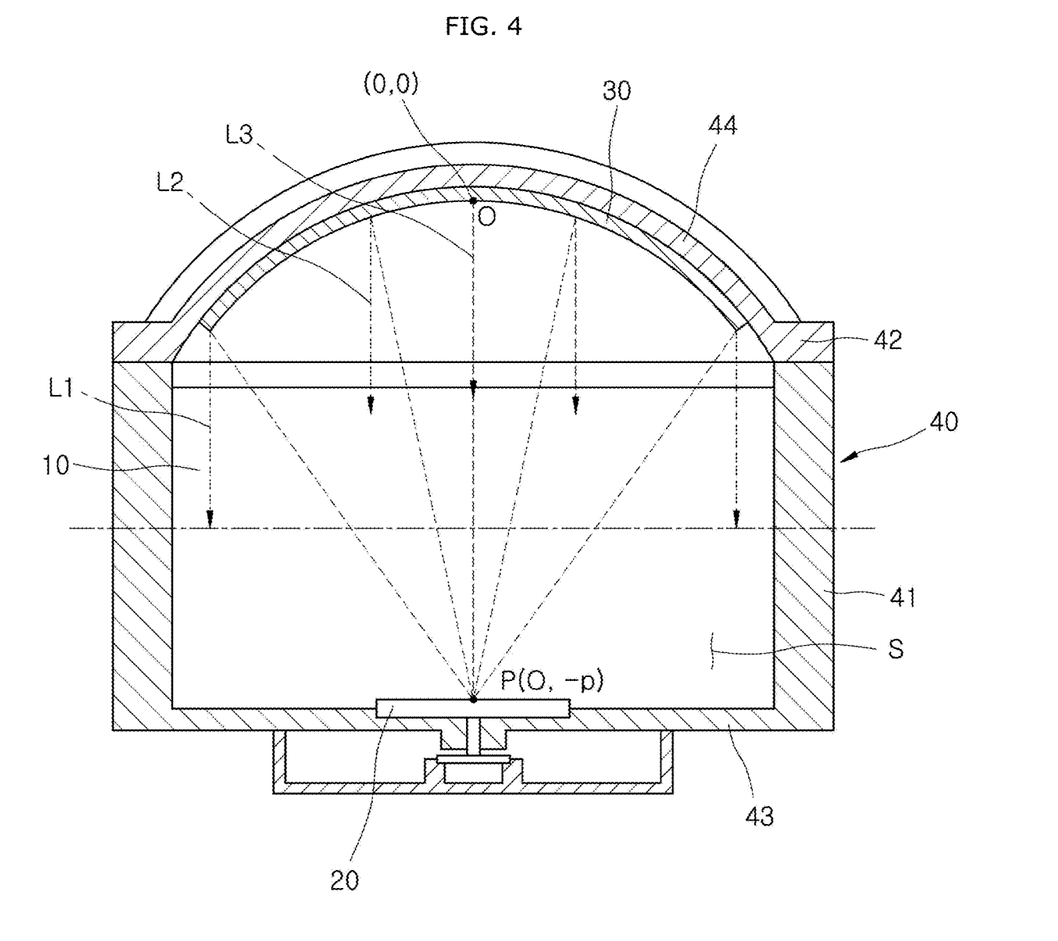
FIG. 4 is a conceptual view illustrating optical paths in FIG. 2.
Figure 5:
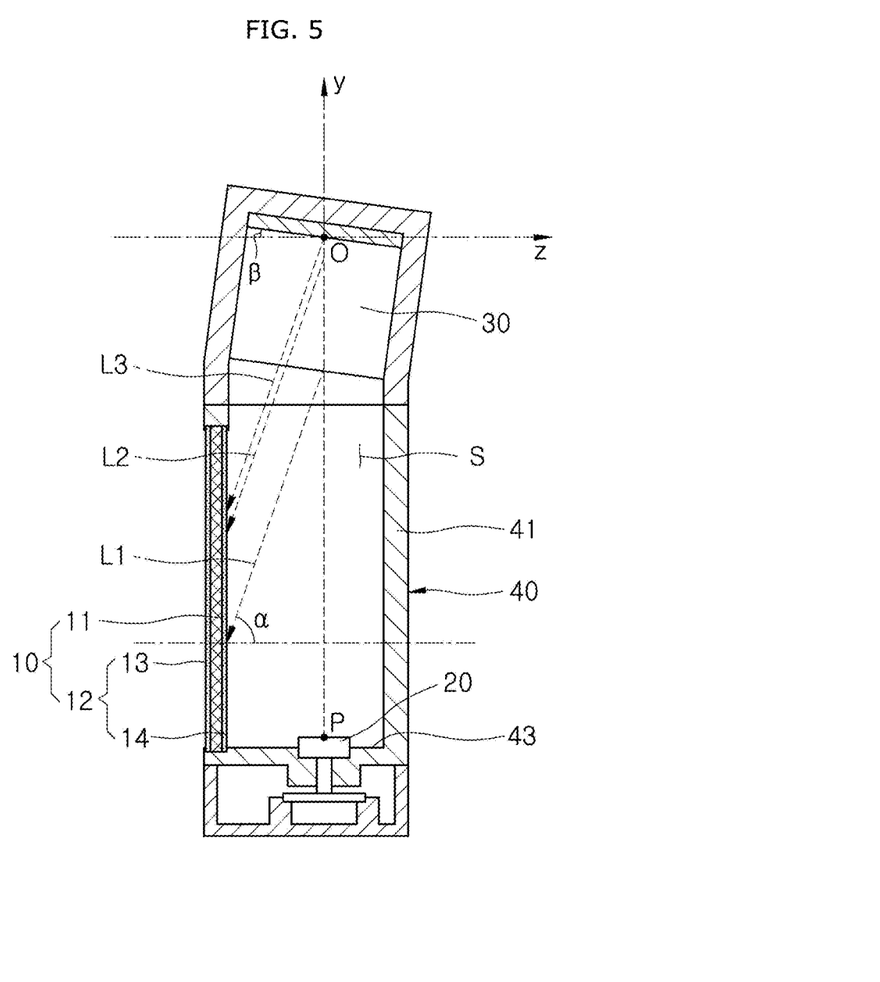
FIG. 5 is a conceptual view illustrating optical paths in FIG. 3.

FIG. 4 is a conceptual view illustrating optical paths in FIG. 2, and FIG. 5 is a conceptual view illustrating optical paths in FIG. 3.

Referring to FIGS. 2 and 4, when the intersecting point of the x axis and the y axis is set to be the origin O (0, 0), the light source 20 is disposed at point P (0, −p) on the y axis, and the curved slope mirror 30 is formed to extend on a parabola corresponding to a value (x, y) of a formula $x^2=-4py$ (where $p\neq 0$). Here, the parabola has the vertex located at the origin O (0, 0), is symmetrical about the y axis, and is convex in the +y direction.

According to the arrangement and shape of the curved slope mirror 30 as described above, rays of light radiated from the light source 20 toward the curved slope mirror 30 in a variety of directions, i.e. rays of light radiated at different angles corresponding to a first light path L1, a second light path L2, and a third light path L3, respectively, have a change in the y value and a change in the z value at predetermined ratios with no change in the x value after arriving at the curved slope mirror 30.

That is, when rays of light are radiated from the light source 20 toward the curved slope mirror 30 along light paths including the first light path L1, the second light path L2, and the third light path L3, the entire rays of light that have arrived at different points on the curved slope mirror 30 are converted into parallel rays of light having changes only in the y value and the z value at predetermined ratios. The parallel rays of light arrive at and enter the hologram plate 10 at a predetermined angle across the entire length of the hologram plate 10 in the x direction. Here, the parallel rays of light mean that the rays of light arriving at different points on the curved slope mirror 30 travel at the same angles and in parallel to each other.

Referring to FIGS. 3 and 5, the incidence angle α of light entering the hologram plate 10 and the tilt angle β of the curved slope mirror 30 have a relationship −(90°−α)/2=β with respect to the z direction. As a specific example, when the predetermined incidence angle α is set to be 75° with respect to the z direction, the value of the tilt angle β of the curved slope mirror 30 is −(90°−75°)/2=−7.5°.

The hologram plate 10 is characterized by generating a 3D hologram image only when light enters at the predetermined incidence angle α. When the curved slope mirror 30 is configured such that the tilt angle β thereof is −7.5° with respect to the z direction, light reflected by the curved slope mirror 30 may arrive at and enter the hologram plate 10 at the incidence angle α corresponding to 75°, in the form of parallel light having the incidence angle α. Accordingly, the 3D hologram image may be reliably generated using the hologram plate 10.

Referring to FIGS. 1 to 3, the housing 40 according to the embodiment of the present disclosure includes a housing body 41, a frame 42, a light source mounting portion 43, and a cover 44.

The housing body 41 is a device portion forming a base skeleton of the housing 40, and has a rectangular case structure. In the housing body 41, the top portion and a side portion are open, more particularly, a y-direction end portion and a z-direction end portion are open. The housing body 41 has the space S defined therein.

The frame 42 is a device portion on which the hologram plate 10 is disposed, and is connected to an open side portion of the housing body 41. The frame 42 is shaped to extend along the peripheral portions of the hologram plate 10. The top portion, the bottom portion, and the side portions of the hologram plate 10 are attached to the frame 42, such that the hologram plate 10 may be firmly disposed in a predetermined position on the housing 40 at a predetermined angle.

The light source mounting portion 43 is a device portion on which the light source 20 is disposed, and is connected to the bottom portion of the housing body 41. The light source 20 is disposed such that the bottom portion thereof is fixedly coupled to the light source mounting portion 43 and the top portion thereof is exposed to the interior of the housing body 41, i.e. the space S, so as to radiate light toward the curved slope mirror 30.

The cover 44 is a device portion on which the curved slope mirror 30 is disposed, and is coupled to the top portion of the housing body 41 while covering the open top portion of the housing body 41. The cover 44, in particular, the internal surface portion of the cover 44 may have a curved shape corresponding to that of the curved slope mirror 30 so as to reliably support, while being able to be coupled to, the curved slope mirror 30.

Since the cover 44 is fabricated separately from the housing body 41, the curved slope mirror 30 may be easily coupled to the interior of the cover 44. Since the cover 44 is coupled to the top portion of the housing body 41, the curved slope mirror 30 may be disposed to face the light source 20.

FIG. 6 is a conceptual view illustrating an example in which the 3D hologram image producing lamp for a vehicle according to the embodiment of the present disclosure is disposed on a vehicle.

The 3D hologram image producing lamp 1 for a vehicle according to the present disclosure alone may realize a function of a head lamp, a fog lamp, a tail lamp, a brake lamp, a turn signal lamp, a position lamp, or the like of a vehicle by displaying a 3D hologram image. Alternatively, the 3D hologram image producing lamp 1 may be disposed in a single lamp receptacle 3 together with an existing lamp realizing the above-described function, thereby realizing a function of upgrading a light distribution image of the existing lamp.

Although an embodiment of applying the 3D hologram image producing lamp 1 for a vehicle according to the present disclosure as a head lamp is illustrated in FIG. 6, the 3D hologram image producing lamp 1 may be disposed in various other outer positions of the vehicle, such as a side mirror, or in various inner positions of the vehicle in order to realize more various convenience functions, design functions, and the like.

The 3D hologram image producing lamp 1 for a vehicle according to the present disclosure having the above-described configuration may display a 3D hologram image by a reduced optical distance from the light source 20 to the hologram plate 10 through the curved slope mirror 30, more particularly, an optical distance corresponding to about 1.5 times the height (i.e. the length in the longitudinal direction or in the y direction) of the housing 40.

For example, when the width in the longitudinal direction of the hologram plate 10 (i.e. the x direction) and the width in the width direction of the hologram plate 10 (i.e. the y direction) are 300 mm×100 mm, respectively, the housing 40 has a height 130 mm to 150 mm obtained by adding the height of the housing body 41 and the height of the cover 44, and the optical distance from the light source 20 to the hologram plate 10 is about 200 mm.

The depth-directional length (i.e. the length in the z direction or the depth of insertion into the lamp receptacle 3) of the housing 40 may be about 35 mm, since the depth-directional length is sufficient when light reflected by the curved slope mirror 30 may arrive at an intermediate portion of the length of the hologram plate 10 in the width direction (i.e. the y direction) at a predetermined incidence angle.

That is, the width of the hologram plate 10 in the longitudinal direction (i.e. the x direction) and the width in the width direction of the hologram plate 10 (i.e. the y direction) are 300 mm and 100 mm, respectively, the 3D hologram image producing lamp 1 for a vehicle according to the present disclosure may be fabricated and used in a small size of 300 mm×(130 mm to 150 mm)×35 mm. This means that the 3D hologram image producing lamp 1 may be compactly fabricated and used at the ratio of this size so as to comply with the size of the hologram plate 10.

The 3D hologram image producing lamp for a vehicle according to the present disclosure may be realized in a small size to be applicable to a vehicle, as described above. Accordingly, the 3D hologram image producing lamp may be freely applied to more various positions as a vehicle lamp for performing a lighting function, a signaling function, a convenience function, a design function, and the like. In realizing the same function, the 3D hologram image producing lamp may realize more various stereoscopic aesthetic appearances and degrees of freedom of design.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A three-dimensional hologram image producing lamp for a vehicle, comprising:
   a light source;
   a hologram plate displaying a three-dimensional hologram image and comprising:
      a first film portion forming a protruding image having a convex shape in a first direction; and
      a second film portion forming a recessed image having a convex shape in a direction opposite the first direction;
   a curved slope mirror having a reflecting surface shaped as a parabolic curved surface, facing the light source, and reflecting light, radiated from the light source, toward the hologram plate; and
   a housing disposed on a lamp receptacle of a vehicle body and having the hologram plate, the light source, and the curved slope mirror mounted thereon, wherein the housing comprises:
      a housing body having a space defined therein,
      a frame connected to a side portion of the housing body, with the hologram plate being disposed thereon,
      a light source mounting portion connected to a bottom portion of the housing body, with the light source being disposed thereon, and
      a cover coupled to a top portion of the housing body, with the curved slope mirror being disposed thereon.

2. The three-dimensional hologram image producing lamp of claim 1, wherein the curved slope mirror extends along a parabola having a focus at a point, at which the light source is disposed.

3. The three-dimensional hologram image producing lamp of claim 2, wherein an intersecting point of an x axis and a y axis is an origin O (0, 0), the light source is disposed at point P (0, −p) on the y axis, and the curved slope mirror extends on a parabola corresponding to a value (x, y) of a formula $x^2=-4$ py, where $p \neq 0$.

4. The three-dimensional hologram image producing lamp of claim 2, wherein the curved slope mirror is inclined toward the hologram plate at a predetermined angle.

5. The three-dimensional hologram image producing lamp of claim 4, wherein, when directions parallel to a longitudinal direction and a width direction of the hologram plate are set an x direction and a y direction, respectively, an incidence angle $\alpha$ of light entering the hologram plate and a tilt angle $\beta$ of the curved slope mirror have a relationship $-(90°-\alpha)/2=\beta$ with respect to a z direction.

6. The three-dimensional hologram image producing lamp of claim 1, wherein the hologram plate comprises:
   a plate portion comprising a light-transmitting material and mounted on the housing; and
   a hologram film portion coupled to the plate portion and displaying a three-dimensional hologram image corresponding to hologram information recorded therein by receiving the light reflected by the curved slope mirror.

7. The three-dimensional hologram image producing lamp of claim 6, wherein the hologram film portion comprises:
   the first film portion which is mounted on one surface portion of the plate portion; and
   the second film portion which is mounted on the other surface portion of the plate portion.

8. A three-dimensional hologram image producing lamp for a vehicle, comprising:
   a light source;
   a hologram plate displaying a three-dimensional hologram image and comprising:
      a first film portion forming a protruding image having a convex shape in a first direction; and
      a second film portion forming a recessed image having a convex shape in a direction opposite the first direction;
   a curved slope mirror having a reflecting surface shaped as a parabolic curved surface, facing the light source, and reflecting light, radiated from the light source, toward the hologram plate; and a housing disposed on a lamp receptacle of a vehicle body and having the hologram plate, the light source, and the curved slope mirror mounted thereon.

\* \* \* \* \*